July 29, 1969 — R. G. SWANSON — 3,457,645
DENTAL EVACUATOR
Original Filed Aug. 15, 1963 — 3 Sheets-Sheet 1

INVENTOR
ROLF G. SWANSON
BY Robert M. Dunning
ATTORNEY

July 29, 1969  R. G. SWANSON  3,457,645
DENTAL EVACUATOR
Original Filed Aug. 15, 1963  3 Sheets-Sheet 2
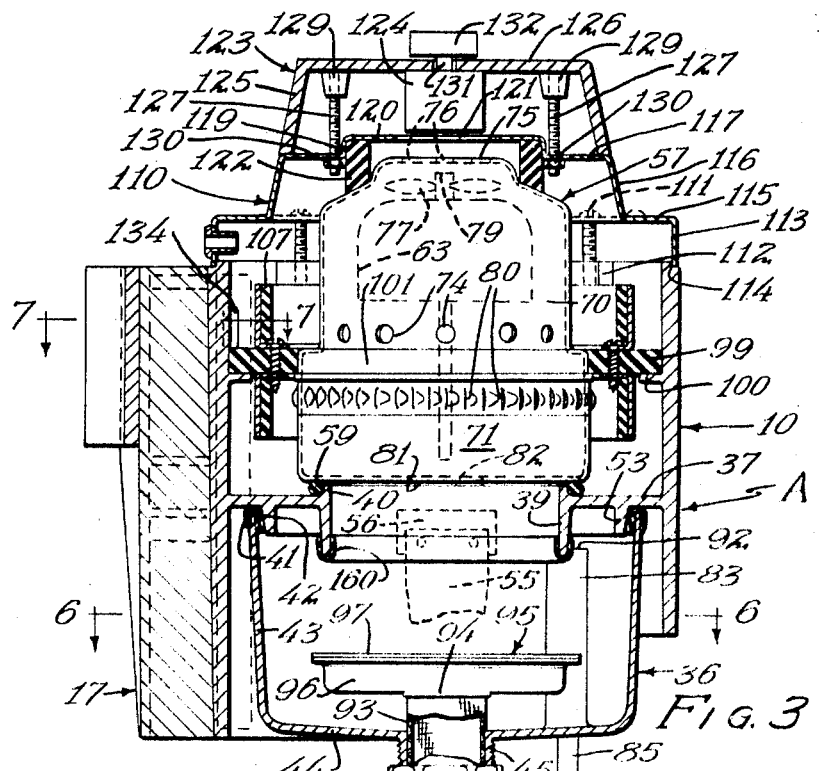
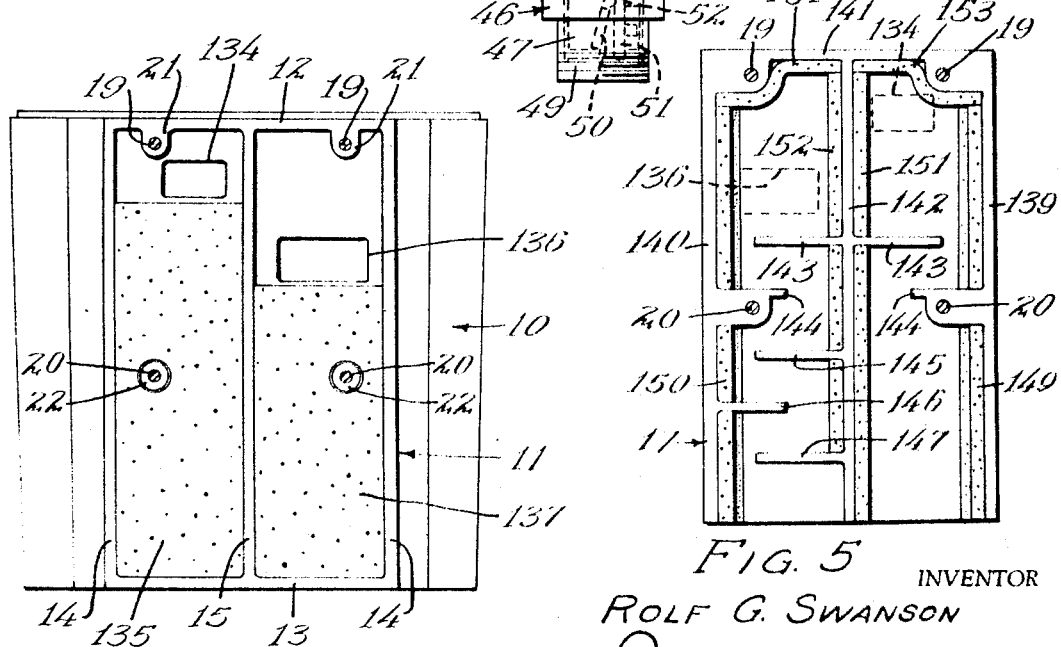
INVENTOR
ROLF G. SWANSON
BY *Robert M. Dunning*
ATTORNEY

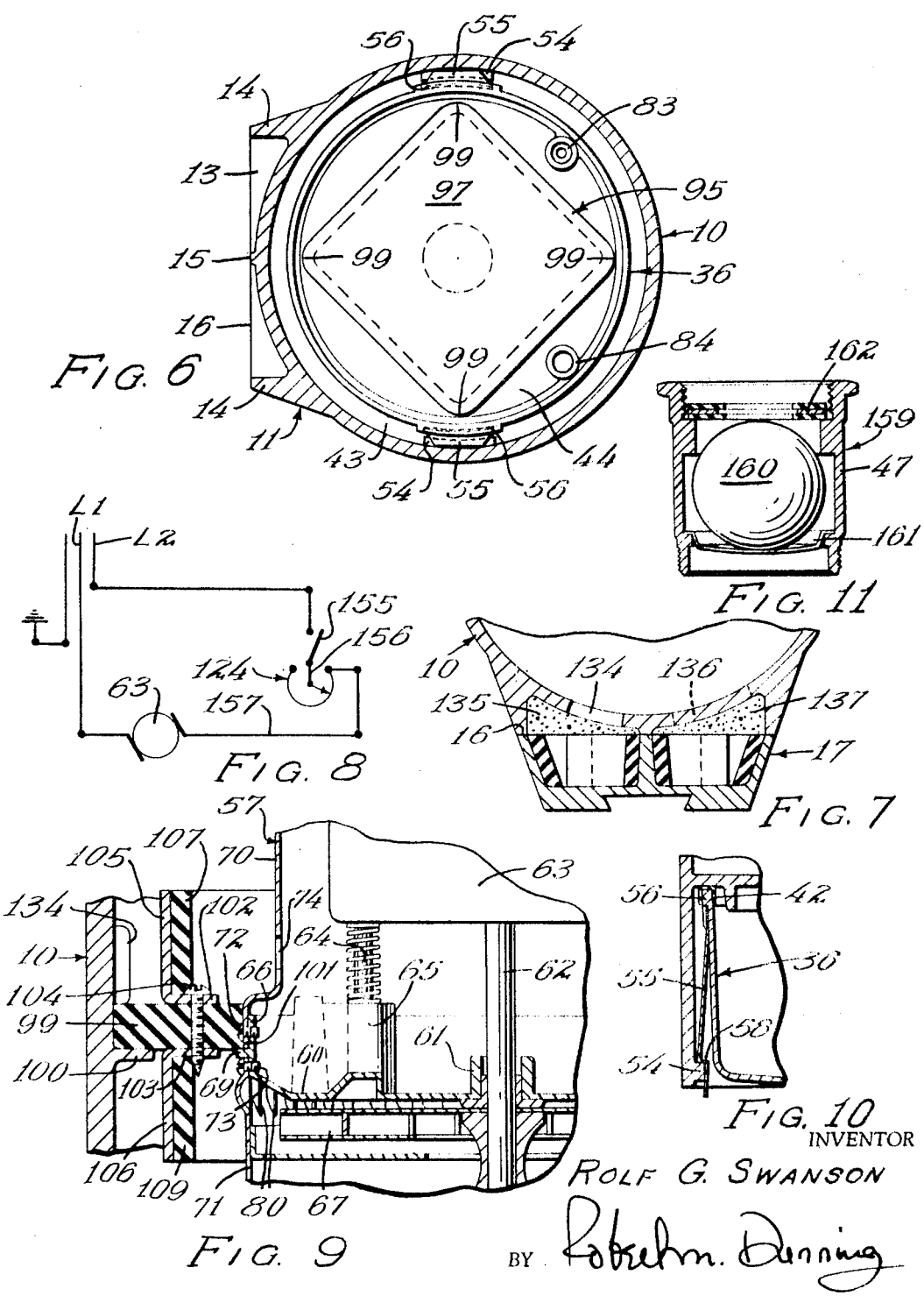

United States Patent Office 3,457,645
Patented July 29, 1969

3,457,645
DENTAL EVACUATOR
Rolf G. Swanson, Minneapolis, Minn., assignor to Torit Manufacturing Company, St. Paul, Minn., a corporation of Minnesota
Continuation of application Ser. No. 302,290, Aug. 15, 1963. This application Mar. 22, 1967, Ser. No. 625,268
Int. Cl. A61c *17/04*
U.S. Cl. 32—33                      6 Claims

ABSTRACT OF THE DISCLOSURE

A dental evacuator is provided including a housing having a collector pan into which air and liquid is drawn by a suction fan and motor. A partition encircles the fan and divides the lower portion of the housing from the upper portion. The motor is mounted in the upper portion and is cooled by a separate fan.

---

This application is a continuation of application Ser. No. 302,290 filed Aug. 15, 1963, and now abandoned.

This invention relates to an improvement in dental evacuator and deals particularly with an apparatus for evacuating saliva, chips, and other material from the mouths of dental patients.

The major portion of the time spent by dental practitioners is preparing and filling cavities in the teeth of patents affected by dental caries. A considerable part of the time required for this work is taken up in preparing the cavity and in the drilling of the tooth to remove all of the decayed portion thereof. The drilling of the teeth requires considerable time because of the heat generated by the drill. Under older procedures, it was necessary for the dentist to stop the drilling operation at frequent intervals and to spray the cavity with water to cool the tooth.

During recent years, apparatus has been produced for spraying the tooth continuously during the drilling operation, thereby materially speeding up the operation. Such a continuous spraying operation has required effective means of evacuating the water and debris from the mouth of the patent. As a result, many dentists have installed apparatus for removing the liquid from the mouth at a rate at least equal to the amount of water being sprayed upon the tooth. It is an object of the present invention to provide an improved device for the evacuation of liquid from the mouth of the patent and which will permit the continuous spraying of the cavity as it is drilled out.

Devices of the type in question, in order to be commercially successful, must incorporate certain features. In the first place, they must be relatively foolproof in operation and require a minimum of maintenance. In order to be practical, they should be relatively automatic in operation, and should not require that the collector pan may be manually emptied each time it fills with water. Such a device cannot make sufficient noise in operation to be objectionable either to the dentist or to the patients.

An object of the present invention resides in the provision of a dental evacuator which is sufficiently noiseless in its operation that it may be used in dental offices without causing annoyance to the dentist, the dental assistant, or to the patient. The apparatus employs a rotary fan which is capable of operating with a very low noise level. The outlet from the fan is baffled by suitable soft cushioning material, and passes through a muffler which effectively keeps the sound of the air leaving the apparatus at a very low level. The interior of the muffler is provided with an inner covering or lining of foam plastic or similar material past which the air may be forced with a minimum of noise.

A further feature of the present invention resides in the provision of a dental evacuator which includes an outer enclosure acting to support a fan and motor assembly, and in cushioning the fan and motor assembly so that it may move or vibrate without direct contact between the assembly and the outer housing except through cushioning means. The assembly rests upon a cushioning ring encircling an intake opening in a partition wall extending horizontally inwardly from the wall of the outer housing. The motor and fan assembly is held from movement by a sealing ring of flexible resilient material which is clamped between a pair of clamping rings which may be drawn together to increase the cross sectional width of the sealing ring, thereby forcing the sealing ring outwardly against the casing wall, and inwardly against the fan enclosure. Thus the fan and motor assembly are completely floating within the housing.

A further feature of the present invention resides in the provision that the apparatus includes two separate air systems, one of which is used to evacuate liquid and foreign material from the mouth of the patient, and the other of which is used for cooling the fan motor. In the past, the air entering the collector pan was baffled in such a manner as to remove the foreign material therein, and at least a portion of the air was then directed through the fan motor to serve as a means of cooling this motor. While most of the foreign material and considerable of the water were removed from the air before it was drawn through the fan motor, this air normally still retained an amount of moisture which usually considerably exceeded the moisture in the ambient air. In the present arrangement, the portion of the housing which contains the motor is sealed from the portion of the housing containing the fan, and air is admitted to the upper portion of the housing which includes the motor for cooling the motor.

A further feature of the present invention resides in the provision of a device of the type described which includes a single muffler which is secured to exterior of the housing and which includes two tortuous outlet passages, one of which communicates with the motor chamber, and the other of which communicates with the fan chamber.

A further feature of the present invention resides in the provision of a device of the type described which includes a fan and motor assembly enclosed within an outer housing, and which is divided by suitable seals to provide a removable collector pan which is at less than atmospheric pressure when the device is in operation, a fan chamber into which the outlet of the fan communicates, and a motor chamber which is usually at a slight positive pressure when the device is in use.

These and other objects and novel features of the present invention will be more clearly and fully set forth in the following specification and claims.

In the drawings forming a part of the specification:

FIGURE 3 is a vertical sectional view through the apparatus, the position of the section being indicated by the line 3—3 of FIGURE 2.

FIGURE 4 is an elevational view of the apparatus with the muffler removed, the position of the view being indicated by the line 4—4 of FIGURE 1.

FIGURE 5 is an elevational view of the muffler, the position of the view being indicated by the line 5—5 of FIGURE 1.

FIGURE 6 is a horizontal section through the collector pan showing the float, the position of the section being indicated by the line 6—6 of FIGURE 3.

FIGURE 7 is a horizontal section through the muffler and adjoining portion of the casing, the position of the section being indicated by the line 7—7 of FIGURE 3.

FIGURE 8 is a diagrammatic view showing the wiring of the apparatus.

FIGURE 9 is an enlarged sectional detail showing a portion of the motor support.

FIGURE 10 is a detail section showing the manner in which the collector pan is supported.

FIGURE 11 is a detail section showing an alternative form of check valve.

Figure 1:
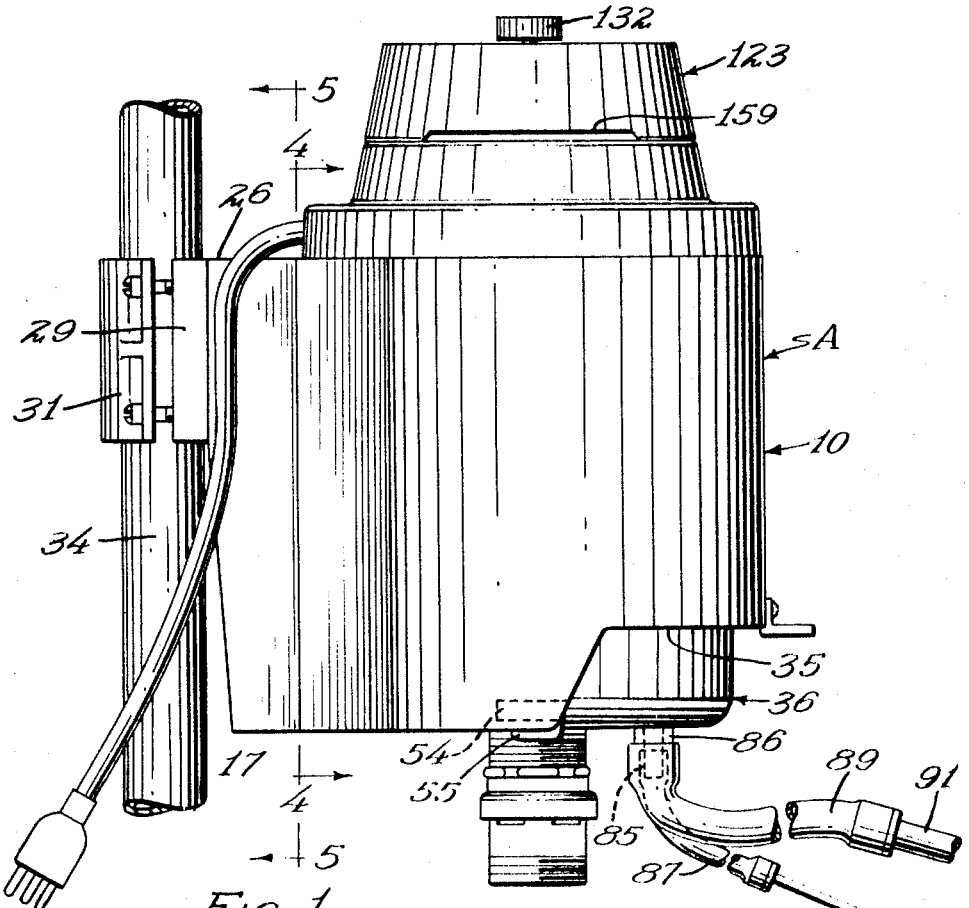
FIGURE 1 is a side elevational view of the apparatus in readiness for operation.

The dental evacuating apparatus which is illustrated in general by the letter A includes a generally cylindrical casing 10 having on one side thereof a generally rectangular frame 11 which is shown in FIGURE 4 as having parallel top and bottom walls 12 and 13, and parallel side walls 14. The frame 11 is divided into two vertical side by side sections by a central partition wall 15. The surfaces of the walls which have been described terminate on a flat common plane 16.

Figure 2:
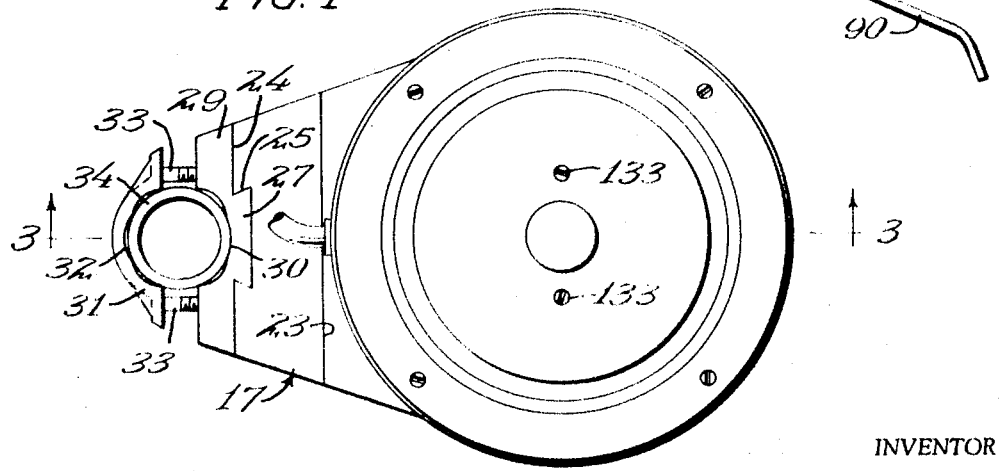
FIGURE 2 is a top plan view of the same.

A muffler 17 illustrated in FIGURE 5 of the drawings is secured to the housing 10 by pairs of bolts 19 and 20 which are threaded into bosses 21 and 22, respectively, which terminate on the plane 16 of the frame 11. As indicated in FIGURE 2 of the drawings, the muffler 17 has and inner surface 23 which is on a common plane and which abuts against the plane 16. The opposite or outer side 24 of the muffler 17 is provided with an undercut groove 25 extending throughout its length, the groove 25 being relatively narrow at the upper end 26 of the muffler 17 and which is relatively wide at the lower end thereof. The groove is designed to accommodate a similarly tapered projection 27 on a post mounting bracket 29, the housing 10 being supported by the weight of the apparatus when the post mounting bracket 29 is fixed to a post. The outer surface of the post mounting bracket 29 includes a groove 30 having an arcuate outer surface arranged on a vertical axis. A post clamp 31 having a similar arcuate inner surface 32 is arranged in opposed relation to the bracket 29 and is connected thereto by clamping bolts 33. In this way, the housing 10 and the associated parts forming the dental evacuator A may be supported by a vertical post or standard 34.

As indicated in FIGURE 1 of the drawings, the side of the housing 10 which is opposite the muffler 17 is notched as indicated at 35, this notch 35 extending substantially throughout one hundred eighty degrees of the periphery of the housing 10. The purpose of this notch 35 is to simplify the removal of the collector pan 36 which will be more fully described. The housing 10 is provided intermediate its ends with an integral inwardly extending ring-shaped partition wall 37 which supports a generally cylindrical flange 39 in coaxial relation with the casing 10. The flange 39 is attached to the wall 37 at its inner extremity, and provides a sleeve through which air may flow. As indicated in FIGURE 3, the flange 39 extends generally downwardly from the partition wall 37, but includes a short upwardly extending end portion 40.

The collector pan 36 has an upper edge 41 which lies on a plane normal to the axis of the pan and which is enclosed by a U-shaped sealing gasket 42. The pan includes a slightly tapering but generally cylindrical wall 43, the upper edge 41 of which has been described. The pan 36 includes a slightly sloping bottom wall 44 which slants inwardly and downwardly to an axial externally threaded sleeve 45. A vacuum breaker 46 is threaded onto the sleeve 45, and includes a hollow cylindrical body 47 which extends downwardly in alignment with the sleeve 45 and which is externally threaded as indicated at 49 to accommodate a suitable drain pipe which is not illustrated in the drawings. While not illustrated specifically in the drawings in view of the fact that the detail of construction forms no part of the present invention, the tubular sleeve 47 encloses a diagonal apertured partition wall 50, the aperture of which may be closed by a valve 51 such as a flap which is hinged to the structure at 52. The flap valve 51 is held closed during the operation of the apparatus, as will be described, when the interior of the pan 36 is subjected to a partial vacuum. An alternative form of valve such as a check valve generally numbered 59 is shown in FIGURE 11. The tubular sleeve 47 includes a ball 160 situated between a ball retainer 161 and a seal 162 having central apertures, the edges of the apertures being concave to sealingly accept the ball, the ball being movable relative to the retainer 161 and the seal 162 in response to the vacuum to open and close the apertures of the retainer 161 and seal 162. The gasketed upper edge 41 of the wall 43 fits about a downwardly projecting flange 53 on the ring-shaped partition wall 37. The cylindrical flange 53 holds the pan centered with respect to the casing.

The inner surface of the housing 10 is provided, near its lower end, with a pair of inwardly extending lugs 54 in diametrically opposed relation as best shown in FIGURES 1 and 10. A pair of spring arms 55 are anchored in bosses 56 on the outer surfaces of the collector pan 36 and extend downwardly and outwardly therefrom as indicated in FIGURE 10 of the drawings. The springs include shoulders 58 which snap into engagement with the lugs 54 as the pan 36 is raised into sealing engagement with the partition wall 37. The lower extremities of the spring arms 55 extend beneath the housing 10, so that the springs may be flexed inwardly to disengage the same from the lugs and to detach the pan 36.

A fan and motor unit which is designated in general by the numeral 57 is supported above the partition wall 37, and the unit which will be described rests upon a resilient sealing ring 59 which encircles the upwardly extending portion 40 of the cylindrical flange 39. The detail of construction of the motor and fan unit is not shown in the drawings, as this detail is of no importance to the present invention. However, it should be stated that the unit includes a disklike bearing plate 60 including a central bearing 61 through which the motor shaft 62 extends. The motor is shown diagrammatically in FIGURE 9 at 63 and is supported above the supporting plate 60 by means of bolts 64 or other suitable means which extend upwardly from a series of angularly spaced bosses 65, one of which is illustrated in FIGURE 9 as extending inwardly from a cylindrical flange 66 extending upwardly from the periphery of the plate 60. The lower end of the motor shaft 62 supports a rotary blower or fan 67 which is below the supporting plate 60. Thus this supporting plate forms a partition between the fan 67 and the motor 63.

The flange 66 is provided between its upper and lower edges with an outwardly projecting ring-shaped flange 69 which forms a divider between the upper motor enclosure shell 70 and the lower fan enclosure shell 71. The upper shell 70 is bolted to the flange 66 by bolts 72, while the lower shell 71 is similarly bolted to the flange 66 by bolts 73.

The motor shell 70 comprises an inverted generally cup-shaped enclosure which is shown in FIGURE 3 as having a series of angularly spaced openings 74 extending therethrough which permits air to leave the shell and flow into the interior of the housing 10. The top closure 75 of the shell is provided with a series of perforations 76 which permit air to enter the upper shell 70. A motor cooling fan 77 is mounted upon the upwardly extending portion 79 of the motor shaft, the purpose of this fan being to admit air into the shell to cool the motor 63.

The lower shell 71 also comprises a generally cup-shaped enclosure having about its periphery near the upper end thereof a series of angularly spaced open louvers 80 through which the air is forced by the rotating blower 67. The bottom closure 81 of the lower shell 71 is provided with an axial aperture 82 providing communication with the interior of the cylindrical flange 39, and accordingly with the interior of the collector pan 36. As will be best seen in FIGURE 6 of the drawings, a pair of hollow sleeves 83 and 84 extend upwardly from the bottom 44 of the collector pan and are preferably molded integrally therewith. One of these sleeves communicates with a smaller diameter sleeve 85 which is integral with the bottom 44 of the collector 36 and extends downwardly therefrom. The other of the sleeves 84 is provided with a larger diameter extension 86 which also extends downwardly from the bottom of the pan. The purpose of these downward extensions 85 and 86 is to provide a means of connection with flexible tubes 87 and 89 provided at their outer ends with pickup nozzles and adapters 90 and 91 which are of different diameter. The pickup nozzle 91 acts to draw in air and moisture in relatively large volume and is the nozzle usually used under normal circumstances. The nozzle 90 is usually known as the surgical tip and is of sufficiently small size to permit air and liquid to be drawn from cavities formed by the extraction of a tooth, or under other circumstances where the larger nozzle cannot readily be used.

Both of the sleeves 83 and 84 terminate somewhat above the lower edge of the cylindrical flange 39, and are outwardly thereof. Thus, in the operation of the apparatus, the air drawn through these sleeves 83, 84 must change direction and flow downwardly before passing through the passage defined by the cylindrical flange 39. This change in direction of the air causes the solid particles and liquid which are entrained in the air to drop to the bottom of the collector pan 36. Only the upper end 92 of the tube 83 is shown in FIGURE 3 due to the position of the section, but it will be understood that the other tube or sleeve 84 extends to a similar height and is also positioned outwardly of the flange 39.

A cylindrical screen 93 having a closed upper end 94 is supported in the threaded sleeve 45 to project upwardly therefrom, and permits the liquid to flow through the vacuum breaker 46 while retaining the larger particles of foreign material in the collector pan. A generally rectangular float 95 including a pan-shaped lower portion 96 and a flat upper closing plate 97 sealed thereto may rest upon the top 94 of the screen 93 when the liquid level in the collector pan 36 is relatively low. As may be seen in FIGURE 6 of the drawings, the corners 99 of the upper plate 97 of the float 95 extend relatively closely adjacent to the wall 43 of the collector pan and hold the float generally centered in the collector pan without providing actual engagement therebetween. It will be noted that one corner of the float 95 extends between the sleeves 83 and 84, so that the float is held from rotation by engagement with one or the other of these pipes.

The motor and fan unit 57, as was stated, rests upon the resilient ring 59 and does not actually engage the upper portion 40 of the flange 39. This unit is held centered in the casing 10 by a cushioning ring or intermediate seal 99 which rests upon an inwardly extending ring-shaped flange 100 on the casing 10 and which encircles the lower portion 101 of the upper shell 70 enclosing the motor 63. As is perhaps best illustrated in FIGURE 9 of the drawings, and is shown generally in FIGURE 3, bearing plates 102 and 103 lie above and below the seal 99 which may be of sponge rubber or other compressible material. The flanges 102 and 103 are connected by clamping screws or bolts 104 so that by tightening these bolts, the intermediate portion of the sealing ring 99 is compressed, tending to force the inner and outer peripheries of the seal against the casing 10 and the lower portion 101 of the upper shell 70 thereby firmly holding the fan and motor unit in centered position through the medium of the resilient material forming the seal. It will be noted that the compression plates 102 and 103 are out of contact both with the motor and fan enclosure and the outer casing 10. The upper clamping plate 102 is provided with an upwardly extending cylindrical flange 105 while the lower clamping plate is provided with a similar downwardly extending cylindrical flange 106. The flanges 105 and 106 are lined with rings 107 and 109, respectively, of soft cushioning wood fibre material. The upper ring 107 lies outwardly of the angularly spaced apertures 74 in the motor shell 70 while the lower ring 109 lies outwardly of the louvers 80. Thus both of these rings serve as baffle rings for air leaving the motor enclosing shell 70 and fan enclosing shell 71, respectively. The louvers are arranged to provide swirling movement to the air as it leaves the fan enclosure.

The housing 10 is provided with a removable cap 110 which is detachably connected to the housing by cap screws 111 which are threaded into angularly spaced bosses 112 projecting inwardly from the inner generally cylindrical surface of the housing. The cap 110 includes a cylindrical shell portion 113 engaged in a peripheral groove 114 at the top of the housing 10. The cap includes a flat ring-shaped portion 115 which extends inwardly from the upper edge of the shell, a frusto-conical portion 116 which inclines upwardly and inwardly from the inner edge of the ring-shaped portion 115, a flat ring-shaped portion 117 extending inwardly from the upper periphery of the frusto-conical portion 116, a short cylindrical portion 119 extending upwardly from the ring-shaped flat portion 117, and a flat top closure 120 connected to the upper extremity of the cylindrical portion 119. This top closure portion 120 is provided with an axial aperture 121 therethrough, through which air may flow.

This particular arrangement is provided so that a resilient cylindrical sealing ring 122 may be enclosed within the cylindrical portion 119 and may bear against the top of the motor shell 70. The closed upper end 75 of the shell 70 is offset to fit within the sealing ring 122, as best illustrated in FIGURE 3. Thus when the cap 110 is in place, the motor and fan unit 57 is further resiliently suspended within the outer casing portions.

A control housing 123 is preferably secured to the cap 110 to form a support for a variable speed control 124 which may also include a switch. The control housing 123 includes a frusto-conical wall 125 having its larger diameter lower edge abutting the ring-shaped portion 117 of the cap 110, and having a top closure disk 126 enclosing the top. The control housing 123 is attached to the cap by studs 127 which are anchored in bosses 129 formed on the under surface of the top closure plate 126, the studs extending through the ring-shaped portion 117 of the cap and being held in place by nuts 130. The variable speed control is provided with a shaft 131 which extends through the center of the top closure plate 126 and which supports an operating knob 132. The variable speed control 124 is held in place by suitable bolts 133 as shown in FIGURE 2.

With reference now to FIGURE 4 of the drawings, it will be noted that an air discharge aperture 134 extends through the wall of the housing 10 at a point outwardly of the cushioned baffle walls 105, 107. In other words, this aperture 134 is located just above the level of the sealing ring 99 as may be seen in FIGURE 3. The outer wall of the casing 10 below the aperture 134 and between one side wall of the frame 11 and the partition wall 15 is filled with a block of sound-absorbing material such as polyester foam, the block being indicated at 135 and being shaped to fit the curvature of the casing 10 with the outer exposed surface of the block being substantially along the plane 16 of the outer edge of the frame 11. A second aperture 136 is provided in the wall of the housing 10 just below the level of the seal 99 and flange 100, the position of this aperture being shown in FIGURE 4, but not showing in FIGURE 3 because of the position of the section. This aperture is located to the right of the partition wall in FIGURE 4 and between this partition wall and the right hand side wall 14 of the frame 11. A block 137 of polyester foam or similar cushioning material extends between the lower edge of the aperture 136 and the bottom wall 13 of the frame 11, the block being formed to fit the curvature of the casing 10 and to extend substantially flush with the plane 16 of the frame 11.

With reference now to FIGURE 5 of the drawings, the muffler 17 is illustrated. The muffler 17 includes a hollow inner surface including generally parallel side walls 139 and 140 which are designed to abut against the sides 14 of the frame 11. The muffler 17 also includes a top wall 141 which is designed to abut against the top wall 12 of the frame 11. The lower edge of the hollow muffler is open to permit the escape of air.

The muffler also includes a central partition wall 142 which is designed to abut against the partition wall 15 within the frame 11. As the view showing the muffler 17 is reversed from the showing in FIGURE 4, the aperture 134 should be located in the area between the partition wall 142 and the side wall 39 as indicated in dotted outline at 134, and the position of the casing aperture 136 is opposite the dotted outline position 136 shown in FIGURE 5.

A pair of baffles 143 extend outwardly in opposite directions from the partition wall 142 toward the side walls 139 and 140, and a second pair of baffle walls 144 extend inwardly from the side walls 139 and 140 at a point spaced below the baffles 143. The baffles 133 and 134 terminate in spaced relation to the opposite side of the chamber in which they are located, and these baffle walls, the center partition 142, the top wall 141, and side walls 139 and 140 all terminate on substantially the common plane 23. The portion of the muffler between the side wall 140 and the partition wall 142 also includes alternately arranged baffles 145, 146, and 147. This portion of the muffler is provided with additional baffles because of the fact that the air passing through this portion of the muffler is in much greater volume than the air passing through the other side of the muffler. In other words, the blower 67 creates a much larger volume of noise than the fan 77 used to cause a circulation of cooling air over the motor.

The side walls 139 and 140 of the muffler 17 are lined with strips of plastic foam indicated at 149 and 150, and additional strips of similar cushioning material 151 and 152 are secured to opposite sides of the baffle wall 142. The upper end of the muffler is also cushioned by strips of foam material indicated at 153 and 154. As a result of this arrangement, noise from the blower and motor fan are absorbed in the muffler so that the operation of the apparatus is not annoying to the dentist or to the patient.

The wiring diagram in FIGURE 8 shows the motor 63 connected to line wire 1, and the control switch 155 connected to the line wire L–2. By closing the switch 155, a circuit is closed from the switch through a conductor 156 to the variable speed control 124 such as a rheostat the other terminal of which is connected by conductor 157 to the other terminal of the motor 63.

In the operation of the apparatus, when the switch 155 is closed, the motor 63 starts in operation and rotates the blower 67 and also the motor cooling fan 77. Air is drawn through slots 159 in the control housing 123, through the axial aperture 121 in the cap 110, through the apertures 76 in the top closing plate 75 of the upper motor enclosing shell 70 to cool the motor 63. This air is expelled through the aperture 74, and passes into the muffler through the aperture 134 after flowing upwardly over the baffle 105, 107 and downwardly outwardly of this baffle. The air then flows downwardly through the muffler 17 and around the baffle shown to the left of the center partition wall 142 in FIGURE 5 until it is exhausted at the bottom of the muffler.

At the same time, air is drawn inwardly through the pickup nozzles 90, 91 and the connecting hoses 87 and 89 and through the tubes or sleeves 83, 84 which terminate outwardly of the cylindrical flange 39. The air changes direction, and flows downwardly into the lower portion of the collector pan 136, and then changes direction again to pass upwardly through the flange 39 and the inlet aperture 82 leading to the fan 67. During this operation, the heavy impurities which may be entrained with the air and liquid, as well as the liquid itself, is deposited in the collector pan 36 so that the air passing through the fan is relatively free of moisture. The air leaving the fan passes through the louvers 80 in the lower shell 71 and swirls within the lower baffle 106, 109, flowing downwardly beneath this baffle and then upwardly to pass through the casing aperture 136 and into the muffler 17. The air then flows past the various baffles in the muffler and leaves through the lower end thereof.

During normal operation, considerable liquid and a minor amount of solid particles are deposited in the collector pan 36. As the interior of the pan 36 is subjected to a partial vacuum, the check valve 46 remains closed and the liquid is held within the pan. As the level of liquid raises within the pan 36, the float 95 is slowly elevated until it nears the lower end of the baffle 39. This lower flange edge is enclosed by a ring-shaped seal 160 of U-shaped cross section. When the float raises to a sufficient degree, it acts to close the lower end of the passage defined by the flange 39 so that the suction created by the fan 67 is lost. At this point, the weight of the liquid within the pan 36 will open the check valve 46, and the liquid contents of the pan will be drained out.

When this occurs, it is usual practice to momentarily turn the apparatus off allowing the pan to drain and allowing the float to return to the lower portion of the pan whereupon the operation can again be started. It will be understood that turning off the motor has the effect of discontinuing the partial vacuum to which the interior of the pan 36 is subjected thereby enabling the check valve 46 to open and the liquid to drain.

I claim:
1. A dental and surgical evacuator including:
   a housing,
   a motor supported within said housing and including a cooling fan coaxial therewith,
   a blower connected below said motor within said housing,
   a partition encircling said motor dividing the interior of said housing into an upper motor chamber and a lower fan chamber,
   a motor shell encircling said motor and having an air inlet at its upper end and outlet openings communicating with said motor chamber just above said partition, a second ring-shaped partition beneath said blower,
   a blower shell encircling said blower and having spaced peripheral outlet openings communicating with said blower chamber,
   said blower shell having an inlet opening at its lower end communicating with an axial passage through said second partition,
   said blower shell being sealed relative to said second partition,
   a collection pan detachably supported beneath said second partition and sealed relative thereto,
   an evacuator tube communicating with the interior of said collector pan,
   a muffler on said housing and including two side-by-side vertical outlet passages having open lower ends,
   said housing including a first opening above said first named partition communicating with one of said muffler outlet passages,
   said housing including a second opening below said first named partition communicating with the other of said muffler outlet passages,
   a plurality of baffle walls extending into said vertical muffler outlet passages creating a tortuous passage for air leaving said housing,
   and a cylindrical deflecting flange on said first partition extending upwardly therefrom and spaced outwardly of said motor shell outlet openings.
2. A dental and surgical evacuator including:
   a housing,
   a motor supported within said housing and including a cooling fan coaxial therewith,
   a blower connected below said motor within said housing,
   a partition encircling said motor dividing the interior of said housing into an upper motor chamber and a lower fan chamber, a motor shell encircling said motor and having an air inlet at its upper end and outlet openings communicating with said motor chamber just above said partition, a second ring-shaped partition beneath said blower, a blower shell encircling said blower and having spaced peripheral outlet openings communicating with said blower chamber, said blower shell having an inlet opening at its lower end communicating with an axial passage through said second partition, said blower shell being sealed relative to said second partition and sealed relative thereto, an evacuator tube communicating with the interior of said collector pan, a muffler on said housing and including two side-by-side vertical outlet passages having open lower ends, said housing including a first opening above said first named partition communicating with one of said muffler outlet passages, said housing including a second opening below said first named partition communicating with the other of said muffler outlet passages, a plurality of baffle walls extending into said vertical muffler outlet passages creating a tortuous passage for air leaving said housing, and a cylindrical deflecting flange on said first partition extending upwardly therefrom and located between said motor shell outlet openings and said first opening through said housing.

3. A dental and surgical evacuator including:

a housing, a motor supported within said housing and including a cooling fan coaxially therewith, a blower connected below said motor within said housing, a partition encircling said motor dividing the interior of said housing into an upper motor chamber and a lower fan chamber, a motor shell encircling said motor and having an air inlet at its upper end and outlet openings communicating with said motor chamber just above said partition, a second ring-shaped partition beneath said blower, a blower shell encircling said blower and having spaced peripheral outlet openings communicating with said blower chamber, said blower shell having an inlet opening at its lower end communicating with an axial passage through said second partition, said blower shell being sealed relative to said second partition, a collector pan detachably supported beneath said second partition and sealed relative thereto, an evacuator tube communicating with the interior of said collector pan, a muffler on said housing and including two side-by-side vertical outlet passages having open lower ends, said housing including a first opening above said first named partition communicating with one of said muffler outlet passages, said housing including a second opening below said first named partition communicating with the other of said muffler outlet passages, a plurality of baffle walls extending into said vertical muffler outlet passages creating a tortuous passage for air leaving said housing, and a cylindrical deflecting flange extending downwardly from said first partition wall spaced outwardly of said blower shell outlet openings.

4. The structure of claim 2 and in which said deflecting flange is between said blower shell outlet openings and said second opening in said housing communicating with said other muffler passage.

5. The structure of claim 1 and in which said flange is lined with sound deadening material.

6. The structure of claim 4 and in which said flange is lined with sound deadening material.

References Cited

UNITED STATES PATENTS

| 2,821,021 | 1/1958 | Winter | 32—33 |
| 2,864,166 | 12/1958 | Shaw | 32—33 |
| 3,078,579 | 2/1963 | Jones et al. | 32—33 |
| 3,138,873 | 6/1964 | Bishop | 32—33 |
| 3,142,298 | 7/1964 | Koski et al. | 128—276 |

FOREIGN PATENTS

| 605,203 | 11/1934 | Germany. |
| 480,068 | 2/1938 | Great Britain. |
| 45,353 | 2/1939 | Netherlands. |

F. BARRY SHAY, Primary Examiner

CHARLES R. WENTZEL, Assistant Examiner